(12) United States Patent
Moegling et al.

(10) Patent No.: US 8,444,223 B2
(45) Date of Patent: May 21, 2013

(54) FOLDING SEAT ASSEMBLY HAVING AUTOMATIC SEAT CUSHION TIP-UP

(75) Inventors: Peter James Moegling, Brighton, MI (US); Todd Rupert Muck, Fowlerville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 305 days.

(21) Appl. No.: 12/847,528

(22) Filed: Jul. 30, 2010

(65) Prior Publication Data

US 2010/0289313 A1  Nov. 18, 2010

Related U.S. Application Data

(63) Continuation-in-part of application No. 12/430,263, filed on Apr. 27, 2009, now Pat. No. 8,104,834.

(51) Int. Cl.
*B60N 2/02* (2006.01)

(52) U.S. Cl.
USPC .................. 297/331; 297/316; 297/378.1

(58) Field of Classification Search
USPC .............. 297/316, 331, 332, 333, 335, 378.1, 297/378.12
See application file for complete search history.

(56) References Cited

U.S. PATENT DOCUMENTS

| | | | |
|---|---|---|---|
| 3,405,971 A | 10/1968 | Kobrehel | |
| 5,158,338 A * | 10/1992 | Hayakawa et al. | 297/335 |
| 6,328,381 B1 | 12/2001 | Smuk | |
| 6,595,588 B2 * | 7/2003 | Ellerich et al. | 297/331 |
| 6,648,392 B2 * | 11/2003 | Fourrey et al. | 296/65.09 |
| 6,655,738 B2 * | 12/2003 | Kammerer | 297/331 |
| 6,739,668 B2 | 5/2004 | Coman et al. | |
| 6,832,815 B2 | 12/2004 | O'Connor | |
| 6,910,739 B2 | 6/2005 | Grable et al. | |
| 6,964,452 B2 * | 11/2005 | Kammerer | 297/331 |
| 7,300,107 B2 * | 11/2007 | Kammerer | 297/336 |
| 7,374,242 B2 | 5/2008 | Champ et al. | |
| 7,469,952 B2 * | 12/2008 | Luttinen et al. | 296/65.09 |
| 7,547,070 B2 | 6/2009 | Nathan et al. | |
| 7,568,764 B2 * | 8/2009 | Harper et al. | 297/331 |
| 2003/0085602 A1 * | 5/2003 | Ogino et al. | 297/331 |

\* cited by examiner

*Primary Examiner* — David Dunn
*Assistant Examiner* — Philip Gabler
(74) *Attorney, Agent, or Firm* — Gifford, Krass, Sprinkle, Anderson & Citkowski, P.C.

(57) ABSTRACT

A seat assembly for a motor vehicle which provides easy access to a third row of passenger seating and folds to provide additional cargo space. The seat assembly includes a base frame operatively attached to the floor of the vehicle. A seat back is pivotally coupled to the base frame about a first pivot axis for movement between a seated position, a stowed position, and a folded position. A proximate end of a sub frame is pivotally coupled to the seat back about a second pivot axis for movement between a seated position and a folded position. A seat cushion is pivotally coupled to the sub frame at a third pivot axis for movement between a seated position, a stowed position, and a folded position. A first end of a link member is pivotally coupled to the base frame and a second opposite end of the link member is pivotally coupled to a distal end of the sub frame.

20 Claims, 7 Drawing Sheets

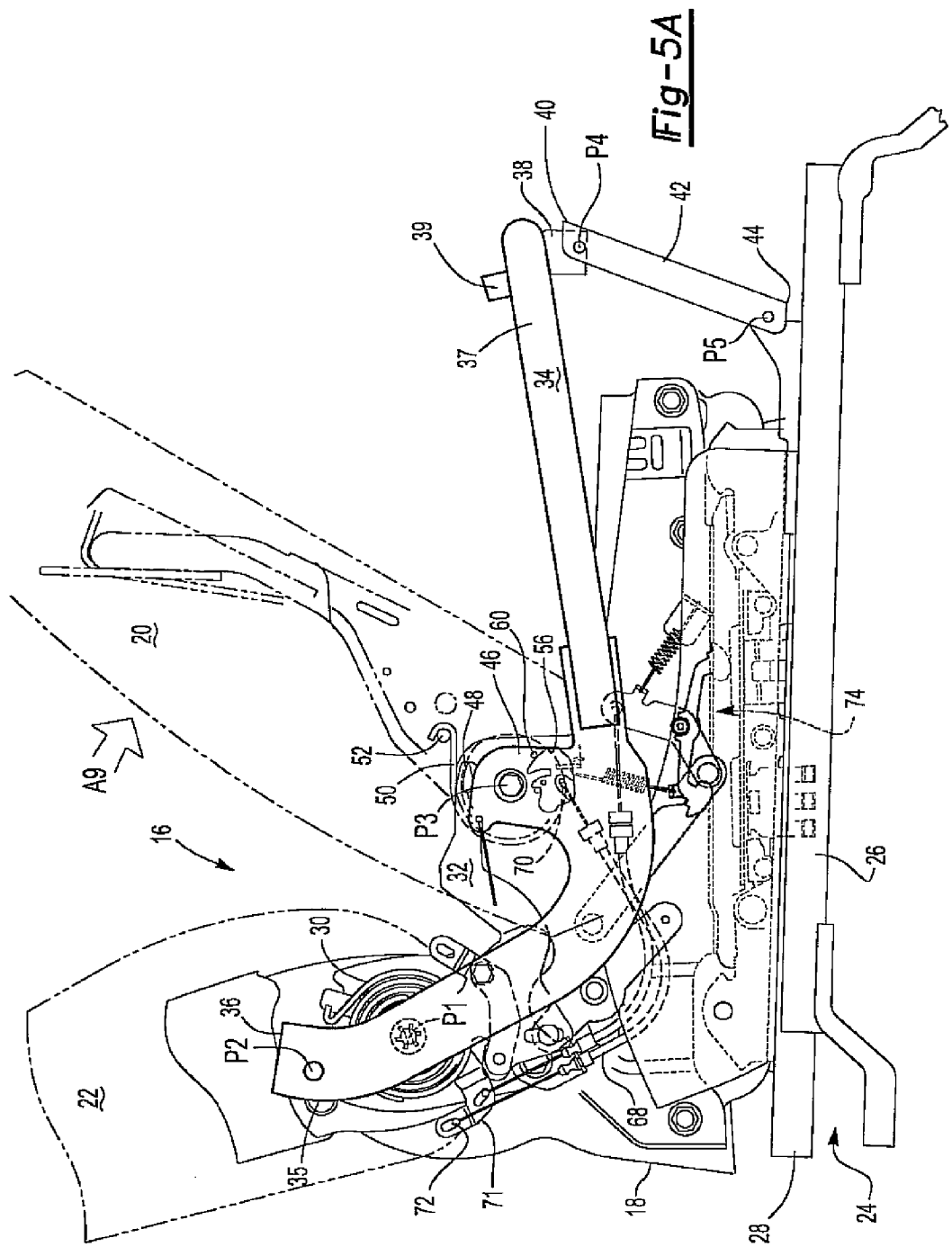

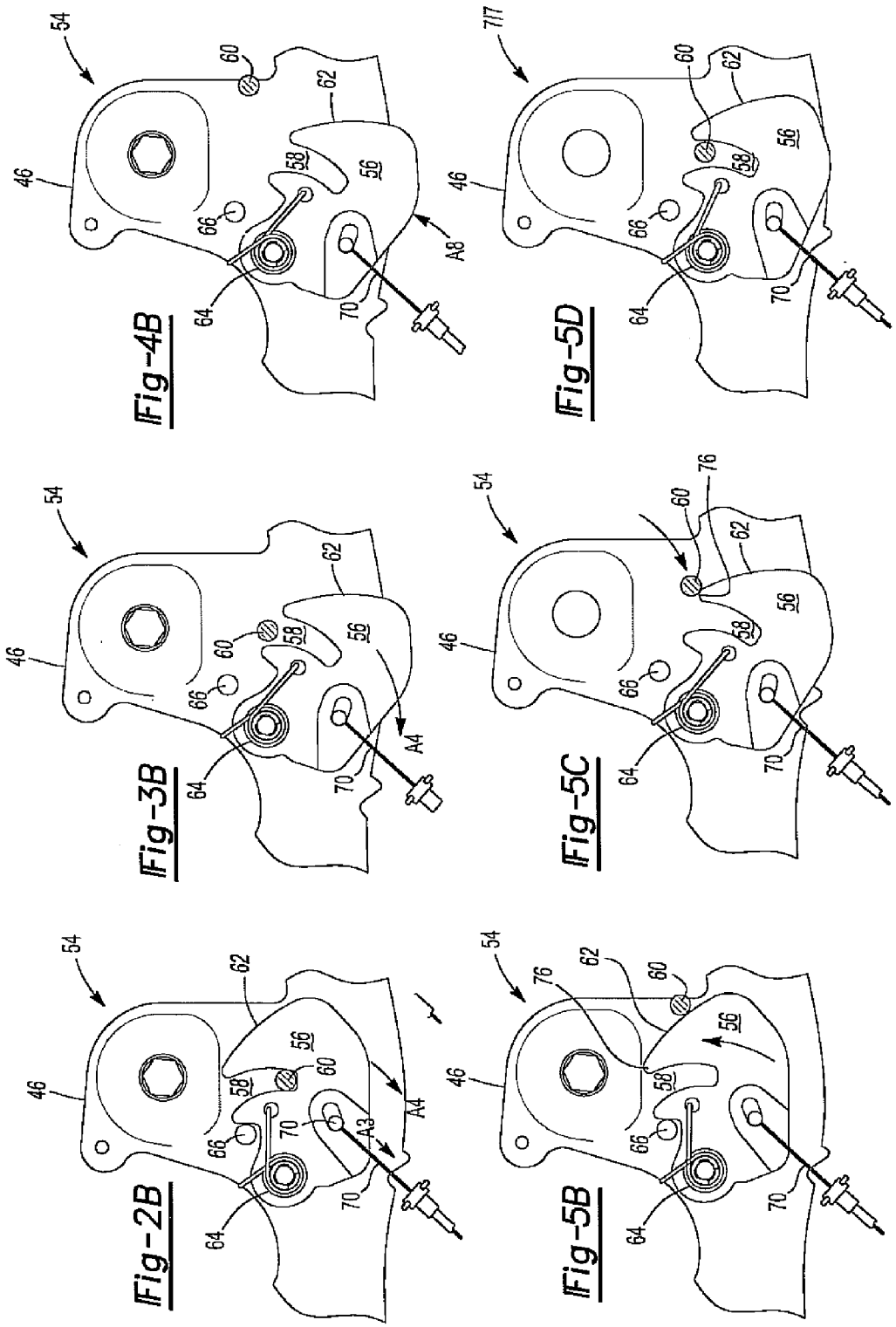

FOLDING SEAT ASSEMBLY HAVING AUTOMATIC SEAT CUSHION TIP-UP

RELATED APPLICATION

The application is a continuation in part to U.S. application Ser. No. 12/430,263 filed Apr. 27, 2009, which is incorporated herein by reference.

FIELD OF THE INVENTION

The invention relates to a seat assembly for use in motor vehicles. More particularly, the invention relates to a seat assembly having a seat cushion and seat back moveable between a seated position, a stowed position, and a folded position.

BACKGROUND OF THE INVENTION

As vehicle seating capacity is a concern for consumers, many vehicles now come equipped with a third row of passenger seating, such vehicles include sports utility vehicles (SUVs), minivans, full size and conversion vans. However, in order to reach the third row of passenger seating a passenger usually has to cross the second row of passenger seating to access a passageway which leads to the third row of passenger seating. As such, the seat assemblies which constitute the second row of passenger seating must be capable of alternating between a seated position and a stowed position (i.e. a walk-in position), to allow for easy access to the third row of passenger seating.

In addition, consumers of vehicles having a third row of passenger seating are also concerned with the amount of cargo space available. The cargo space is limited as the second row of passenger seating can interfere with the transfer of larger cargo. It is known to provide the second row of passenger seating with a folding type seat assembly which can be positioned so as to increase the cargo space of the vehicle. However, these previously known folding seat assembly lack a stowed position allowing access to a passageway to the third row of passenger seating.

Accordingly, it is desirable to have a seat assembly which provides a passenger with a quick and easy ability to move the seat assembly from the seated position to the stowed position and which increases the cargo space available by incorporating a fold down function into the seat assembly.

SUMMARY OF THE INVENTION

The present invention provides a seat assembly which overcomes the above-mentioned disadvantages of the previously known seat assembly designs.

In brief, a seat assembly for a motor vehicle which provides easy access to a third row of passenger seating and folds to provide additional cargo space. The seat assembly includes a base frame operatively attached to the floor of the vehicle. A seat back is pivotally coupled to the base frame about a first pivot axis for movement between a seated position, a stowed position, and a folded position. A proximate end of a sub frame is pivotally coupled to the seat back about a second pivot axis for movement between a seated position and a folded position. A seat cushion is pivotally coupled to the sub frame at a third pivot axis for movement between a seated position, a stowed position, and a folded position. A first end of a link member is pivotally coupled to the base frame and a second opposite end of the link member is pivotally coupled to a distal end of the sub frame.

BRIEF DESCRIPTION OF THE DRAWINGS

Advantages of the present invention will be readily appreciated as the same becomes better understood by reference to the following detailed description when read in conjunction with the accompany drawings, wherein like reference characters refer to like parts throughout the several views and in which:

FIG. 2B is an enlarged view of the locking mechanism of FIG. 2 illustrating the latch in the engaged position and the seat cushion locked in the seated position;

FIG. 3B is an enlarged view of the locking mechanism of FIG. 3 illustrating the latch in the disengaged position and the seat cushion unlocked from the seated position;

FIG. 4B is an enlarged view of the locking mechanism of FIG. 4 illustrating the latch in the disengaged position and the seat cushion in the stowed position;

FIG. 5A is a partial side elevational view of the seat assembly showing the seat back in the seated position, the seat cushion in the stowed position, and the sub frame in the seated position;

FIG. 5B is an enlarged view of the locking mechanism of FIG. 5 illustrating the latch in the engaged position and the seat cushion in the stowed position;

FIG. 5C illustrates the locking mechanism engaging with the retention member as the seat cushion is moved from the stowed position to the seated position;

FIG. 5D illustrates the locking mechanism engaging with the retention member as the seat cushion is moved from the stowed position to the seated position;

DETAILED DESCRIPTION OF THE INVENTION

The present invention has utility as a seat assembly for use in a motor vehicle which overcomes the above-mentioned disadvantages. The inventive seat assembly provides a passenger with a quick and easy ability to move both the seat cushion and the seat back of the seat assembly from the seated position into the stowed position. Further, concerns over the amount of available cargo space are eliminated by providing the seat assembly having a folded position.

Figure 1:
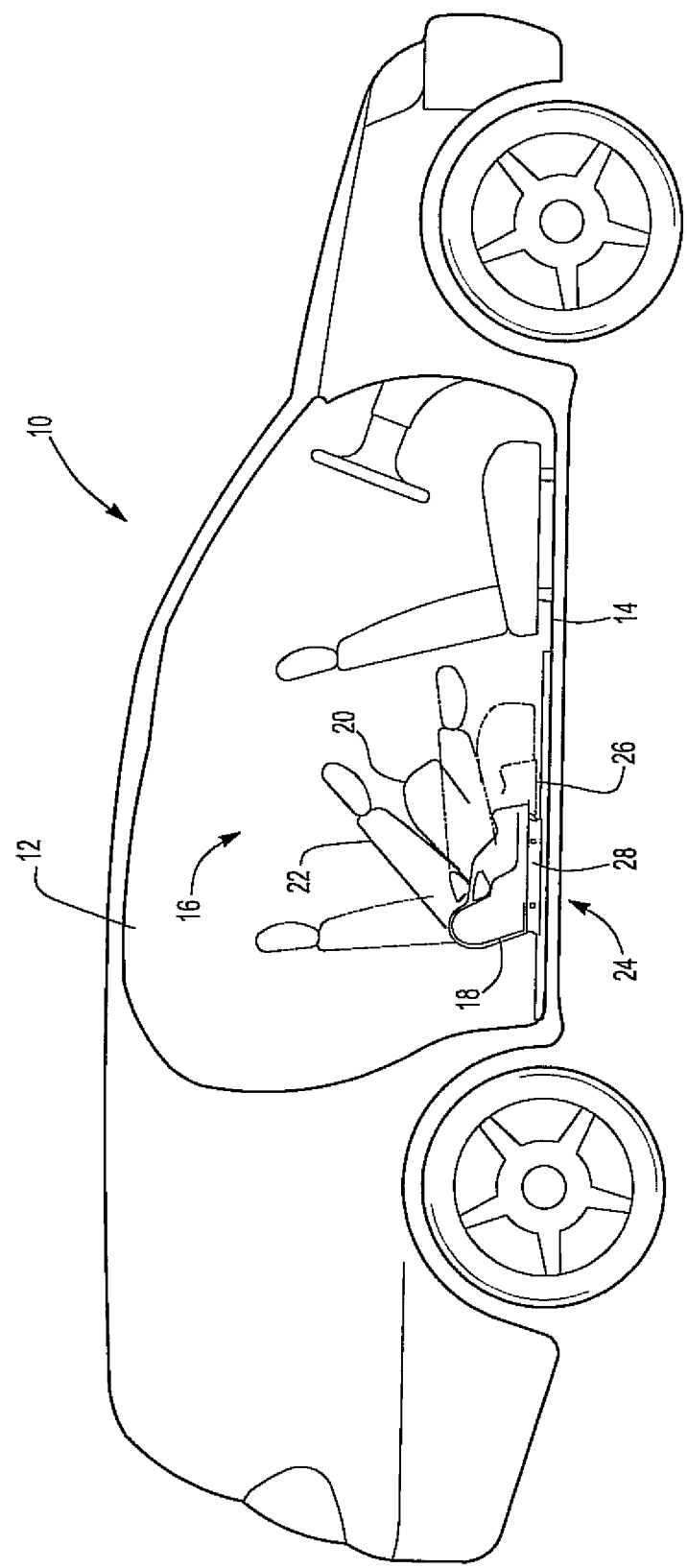
FIG. 1 is a partial side elevational view illustrating an automotive vehicle having the inventive seat assembly.

Referring to the FIG. 1 an automotive vehicle is generally illustrated at 10. The automobile includes a passenger compartment 12 having a floor 14. A front row seating, including the driver's seat; a second row seating; and optionally a third row seating (not shown) or additional cargo area are provided within the passenger compartment 12. A seat assembly 16 located in the second row seating, includes a base frame 18, a seat cushion 20, and a seat back 22. The seat assembly 16 is moveable between a seated position, a stowed (walk-in) position, and a folded position. As seen in FIG. 1 in ghost, the seat back 22 is positioned generally upright and the seat cushion 20 is in a generally horizontal position when in the seated position so as to support an occupant.

The passenger compartment 12 includes a pair of a pair of lower rails 26 attached to the floor 14 of the passenger compartment. A pair of upper rails 28 are attached to the base frame 18 and are in sliding engagement with the pair of lower rails 26 for horizontal movement of the entire seat assembly 16. The base frame 18 is optionally releasably mounted to the upper rails 28 so that the entire seat assembly 16 may be removed from the passenger compartment 12 of the vehicle 10.

The seat assembly 16 is selectively positioned between a stowed (walk-in) position and a folded position. In the stowed position, the seat back 22 is rotated forwardly and the seat cushion 20 is rotated upwardly. The stowed position allows an occupant greater access to the third row seat or additional cargo space as the seat cushion 20 is rotated upwardly which decreases the overall length of the seat assembly 16 allowing the entire seat assembly 16 to slide farther forward along the track system 24. In the folded position, seen in ghost in FIG. 1, the seat cushion 20 rotates forwardly and downwardly and the seat back 22 rotates forwardly to a generally horizontal position so as to overlay the seat cushion 20. The amount of cargo space is increased as the seat cushion 20 is rotating downwardly thereby allowing the seat back 22 to rotate to closer to the floor 14. The generally horizontal position of the seat back 22 in the folded position also provides a flat load surface for the storage of cargo.

Figure 2A:
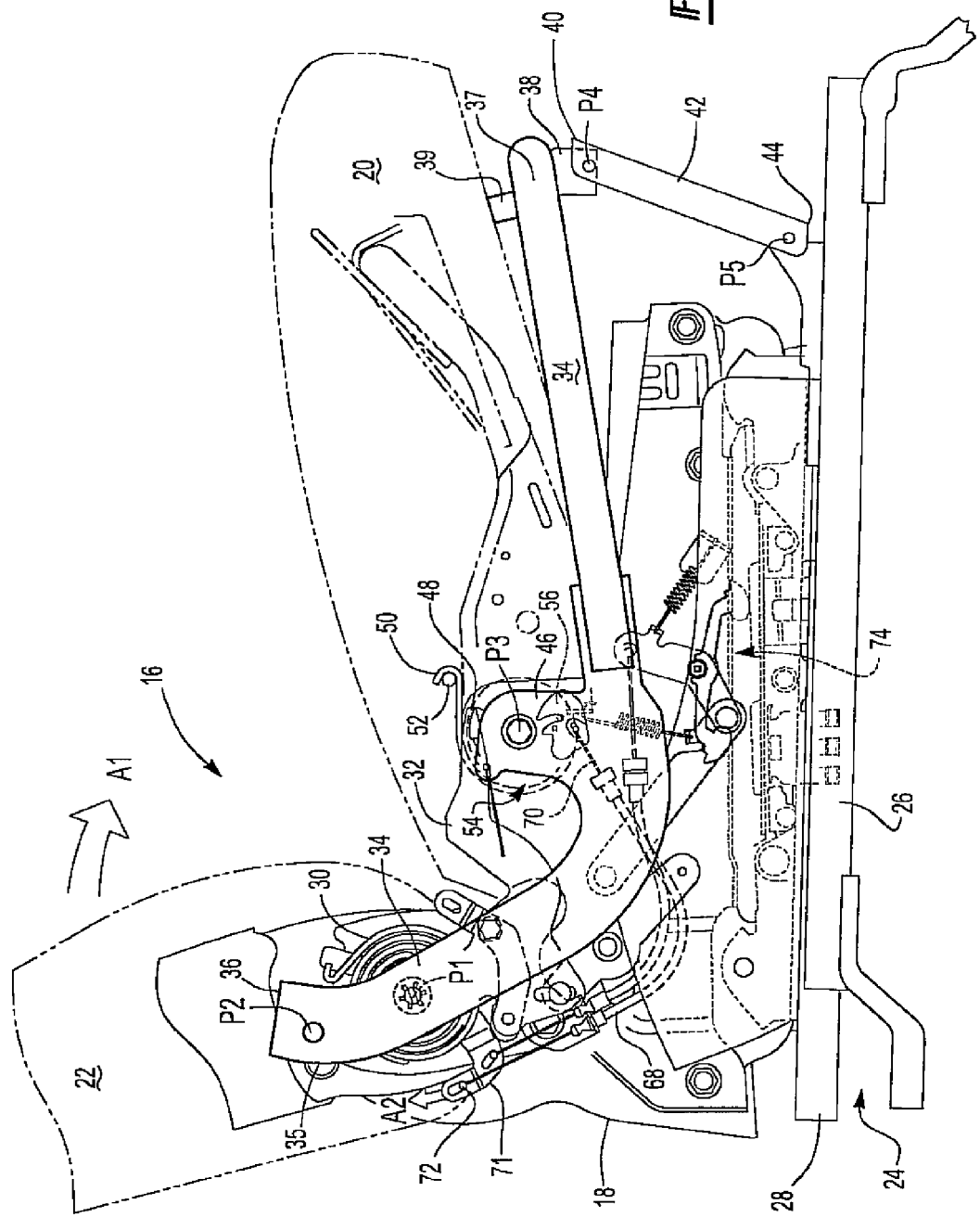
FIG. 2A is a partial side elevational view of the seat assembly showing the seat cushion in the seated position, the seat back in the seated position, and the sub frame in the seated position.

With reference to FIG. 2A and FIG. 2B, the seat back 22 is pivotally mounted to the base frame 18. The seat back 22 is pivotally moveable about a first pivot axis P1 for selective movement between the seated position seen in FIG. 2A, the stowed position seen in FIG. 3A, and the folded position seen in FIG. 6A. The seat back 22 includes a seat back biasing mechanism 30, such as a clock spring, which continuously biases the seat back 22 towards the stowed position. A seat back latch releasably locks the seat back 22 in the seated position. A lever 32, controls the seat back latch such that actuation of the lever 32 will disengage the seat back latch unlocking the seat back 22 from the seated position. As such, the seat back 22 is capable of automatic movement from the seated position to the stowed position upon being unlocked from the seated position.

The seat assembly further includes a sub frame 34 which connects the seat cushion 20 to the seat back 22 and the base frame 18. The sub frame 34 has a generally U-shape, as viewed from above, with a member traversing the width of the seat cushion 20. As seen in the Figures the sub frame has a generally F-shape with a first arm 35 having a proximate end and a second arm in the form of a latch bracket 46 on one side and a spring bracket 48 of the opposite side attached to a leg 37 extending having the length of the seat cushion 20. The first arm 35 has a generally curved shape and extends in a generally normal direction from the leg 37. The latch bracket 46 extends in a generally normal direction from the leg 37 between the first arm 35 and the distal end 38.

The seat back 22 is pivotally mounted to the first arm 35 of the sub frame 34 adjacent the proximate end 36, by a pin, about a second pivot axis P2 which is spaced apart and parallel to the first pivot axis P1. The sub frame 34 is connected to the base frame 18 through link member 42. A distal end 38 of the sub frame 34 is pivotally attached to a first end 40 of a link member 42 about pivot axis P4. A second end 44 of the link member 42 is pivotally attached to one of the pair of upper rails 28 of the track system 24, about pivot axis P5, thereby operatively connecting the sub frame 34 to the base frame 18.

As stated above, the sub frame 34 includes a second proximate end 36 and a second distal end 38 disposed on an opposite side of the seat assembly 16. The second proximate end 36 is pivotally attached to the opposite side of the seat back 22 about pivot axis P2. Further, a second link member 42 connects the second distal end 38 of the sub frame 34 about pivot axis P4 and to the other of the pair of upper rails 28 about pivot axis P5.

A stopper 39 is positioned on a top side of the leg 37 of the sub frame 34 adjacent the distal end 38. The seat cushion 20 abuts the stopper 39 when the seat cushion 20 is in the seated position.

Figure 3A:
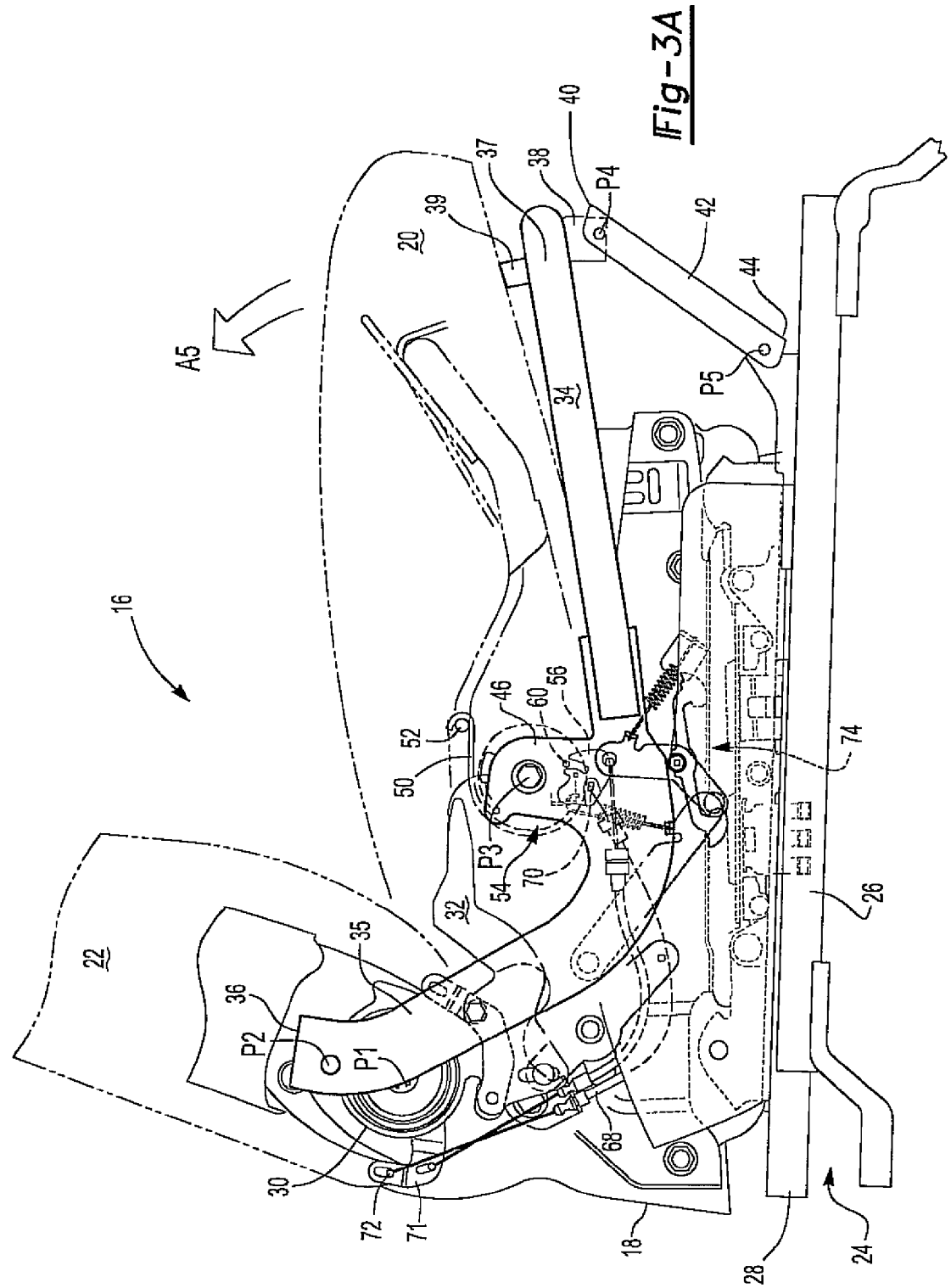
FIG. 3A partial side elevational view of the seat assembly showing the seat cushion in the seated position, the seat back in the stowed position and the sub frame in the stowed position.
Figures 6A, 6B:
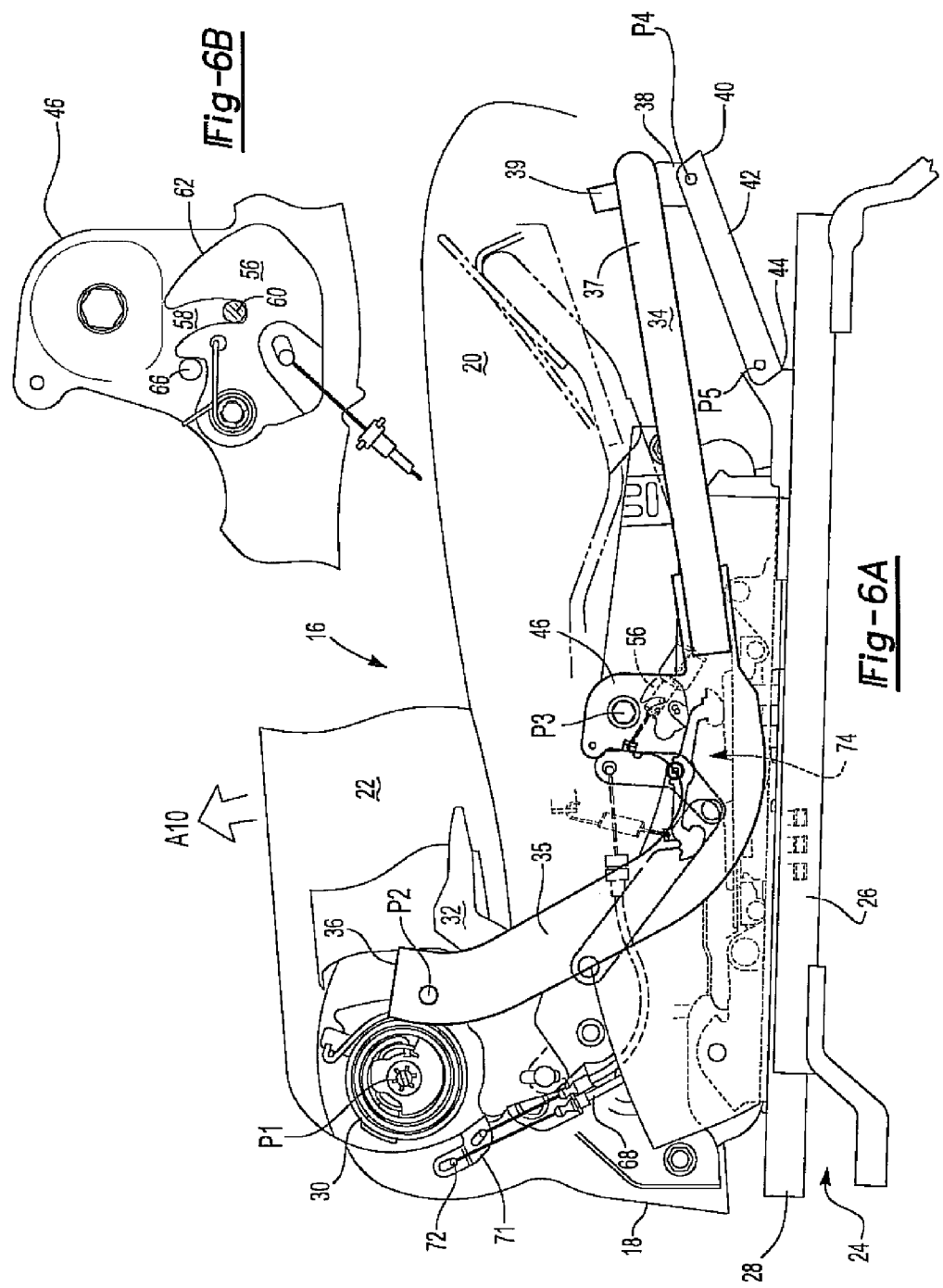
FIG. 6A is a partial side elevational view of the seat assembly showing the seat back in the folded position, the seat cushion in the folded position, and the sub frame in the folded position.
FIG. 6B is an enlarged view of the locking mechanism of FIG. 6 illustrating the latch in the engaged position.

The seat back 22, the sub frame 34, the link member 42, and the base frame 18 define a four-bar linkage system which allows the sub frame 34 to rotate forwardly and downwardly to a stowed position, as seen in FIG. 3A, in response to movement of the seat back 22 from the seated position to the stowed position. Further, the four bar linkage system provides the sub frame 34 to move into a compact folded position in response to movement of the seat back 22 from the seated position to the folded position, as seen in FIG. 6A.

In addition, the lever 32 controls the seat back latch to allow the seat back 22 to move from the seated position to the folded position. The lever 32 is a two position lever such that actuation of the lever 32 to the first position allows movement of the seat back 22 from the seated position to the stowed position, and actuation to the second position allows movement of the seat back 22 from the seated position to the folded position. When the lever 32 is actuated to the first position the seat back 22 is moved into the stowed position, and the seat back latch prohibits movement of the seat back 22 into the folded position. As the sub frame 34 is driven by the movement of the seat back 22, the restriction of the seat back 22 to move from the stowed position to the folded also restricts the movement of the sub frame 34 from the stowed position to the folded position. The two positions of the lever 32 allow a user to selectively position the seat back 22 into either the stowed position or the folded position.

The seat cushion 20 is pivotally mounted to the sub frame 34 between a latch bracket 46 and a spring bracket 48 about a third pivot axis P3. As seen in the Figures, the second pivot axis P2 is vertically spaced above the third pivot axis P3, with the first pivot axis P1 positioned between the second pivot axis P2 and the third pivot axis P3 when the seat assembly 16 is in the seated position. Further, the third pivot axis P3 is positioned between the second pivot axis P2 and the fourth pivot axis P4.

The latch bracket 46 and the spring bracket 48 are disposed on opposite sides of the sub frame between the proximate end 36 and the distal end 38. As seen in the Figures, the latch bracket 46 and the spring bracket 48 are formed as one piece with the sub frame 34; however, the latch bracket 46 and the spring bracket 48 are optionally formed as separate pieces which are fastened to the sub frame 34. The seat cushion 20 is selectively moveable between a seated position, as seen in FIG. 2A, and a stowed position, as seen in FIG. 5A. The seat cushion 20 is pivotal about pivot axis P3 independent of the sub frame 34, thereby allowing the user to move the seat back 22 and the seat cushion 20 to the stowed position or the entire seat assembly 16 into the folded position.

The spring bracket 48 includes a seat cushion biasing mechanism 50, such as a clock spring, having a first end in the shape of a hook to engage a seat cushion tab 52. The seat cushion biasing mechanism 50 has a second end which is secured to the spring bracket 48 such that the seat cushion biasing mechanism 50 continuously biases the seat cushion 20 towards the stowed position. The torque of the seat cushion biasing mechanism 50 is calculated to be capable of lifting the seat cushion 20 from the seated position to the stowed position, while remaining in the stowed position during normal driving condition, such as a rapid deceleration or downhill driving.

The latch bracket 46 includes a locking mechanism 54 of the seat assembly 16. The locking mechanism 54 is operable to lock the seat cushion 20 when the seat cushion 20 is in the seated position. Further, the locking mechanism 54 is capable of engaging the seat cushion 20 at an intermediate position between the seated position and the stowed position to prevent movement of the seat cushion 20 towards the stowed position while movement of the seat cushion 20 towards the seated position is unimpeded.

The locking mechanism 54 includes a latch 56 which is pivotally mounted to the latch bracket 46, between the latch bracket 46 and the seat cushion 20, for movement between an engaged position and a disengaged position. The latch 56 includes an elongated slot 58 extending from the exterior of the latch 56 towards the interior of the latch 56. The elongated slot 58 has an arcuate shape due to the walls of the latch 56 which define the elongated slot 58 having complementary cam angles, ranging from about 3° to about 6°, preferably 5.7°.

The elongated slot 58 is dimensioned to receive a retention member 60, illustratively including a pin, tab or other such suitable protrusions, which extends outwardly from the corresponding side of the seat cushion 20 to a point between the latch 56 and the latch bracket 46. The cam angle allows for the elongated slot to engage the retention member 60 having a diameter or width ranging from about 3.5 mm to about 8 mm, preferably 6 mm.

The latch 56 has an angled exterior side known as a guide edge 62 which guides the retention member 60 into the elongated slot 58. The interaction of the retention member 60 and the elongated slot 58 and the guide edge 62 will be discussed in greater detail below.

A latch biasing mechanism 64, such as a coil spring, biases the latch 56 towards the engaged position. One end of the latch biasing mechanism 64 is secured to the latch 56 and the other end is secured to the latch bracket 46 such that the latch 56 is continuously biased towards the engaged position. A stop member 66 extends outwardly from the latch bracket 46 to prevent movement of the latch 56 beyond the engaged position. The seat back 22 and the latch 56 are interconnected by a cable 68, such as Bowden cable, having a latch end 70 attached to the latch 56 and a seat back end 72 attached to a rotating bracket 71 attached to the seat back 22 about pivot axis P1. As described below, the rotating bracket 71 will rotate with the seat back 22 from the seated position to the stowed position upon actuation of the lever 32 to the first position. However, upon actuation of the lever 32 to the second position, the rotating bracket 71 does not rotate with the seat back 22 to the folded position. This allows the latch 56 to remain in the engaged position, as the cable 68 is not placed under tension, thereby allowing the seat cushion 20 to remain lock in place with respect to the sub frame 34 when the seat assembly 16 is moved into the folded position, as seen in FIGS. 6A and 6B.

The seat assembly 16 further includes a rail lock mechanism 74 capable of locking the seat assembly 16 into a position a seated position for supporting an occupant and a cargo position in which the entire seat assembly slides forward on the track system 24. The rail lock mechanism 74 locks and unlocks the seat assembly 16 in response to movement of the seat back 22. As such, by actuating the lever 32 to the first position, the seat back 22 moves from the seated position to the stowed position which disengages the latch 56 moving the seat cushion 20 from the seated position to the stowed position, and unlocking the rail lock mechanism 74 from the seated position. The seat assembly 16 is optionally continuously biased towards the cargo position such unlocking the rail lock mechanism 74 will automatically slide the seat assembly from the seated position to the stowed position. In addition, once the rail lock mechanism 74 locks the seat assembly 16 in the cargo position, movement of the seat back 22 from the stowed position to the seated position will unlock the rail lock mechanism 74. An example of such a rail lock mechanism is disclosed in commonly assigned U.S. patent Ser. No. 12/628,489 filed on Dec. 1, 2009, which is herein incorporated by reference.

In order to facilitate a better understanding of the principals associated with the inventive seat assembly, the operation of moving the seat assembly 16 between the seated position and the stowed position will now be described. As seen in FIGS. 2A and 2B, the seat assembly 16 is in the seated position, with the seat cushion 20 locked in the seated position, the seat back 22 locked in the seated position, the sub frame 34 in the seated position and the latch 56 in the engaged position.

Upon actuation of lever 32 into the first position the seat back latch is partially released and the seat back 22 is unlocked from the seated position. The seat back biasing mechanism 30, no longer restrained by the seat back latch, biases the seat back 22 towards the stowed position in the direction of A1; however, the seat back 22 is restricted from movement beyond the stowed position and into the folded position by the seat back latch. The rotating bracket 71 rotates with the seat back 22 pulling the seat back end 72 of cable 68 in the direction of A2. Consequently, the cable 68 and the latch end 70 are pulled in the direction of A3. The force exerted by the latch end 70 on the latch 56 overcomes the biasing force of the latch biasing mechanism 64, and the latch 56 is pulled from the engaged position towards the disengaged position in the direction of A4.

Figure 4A:
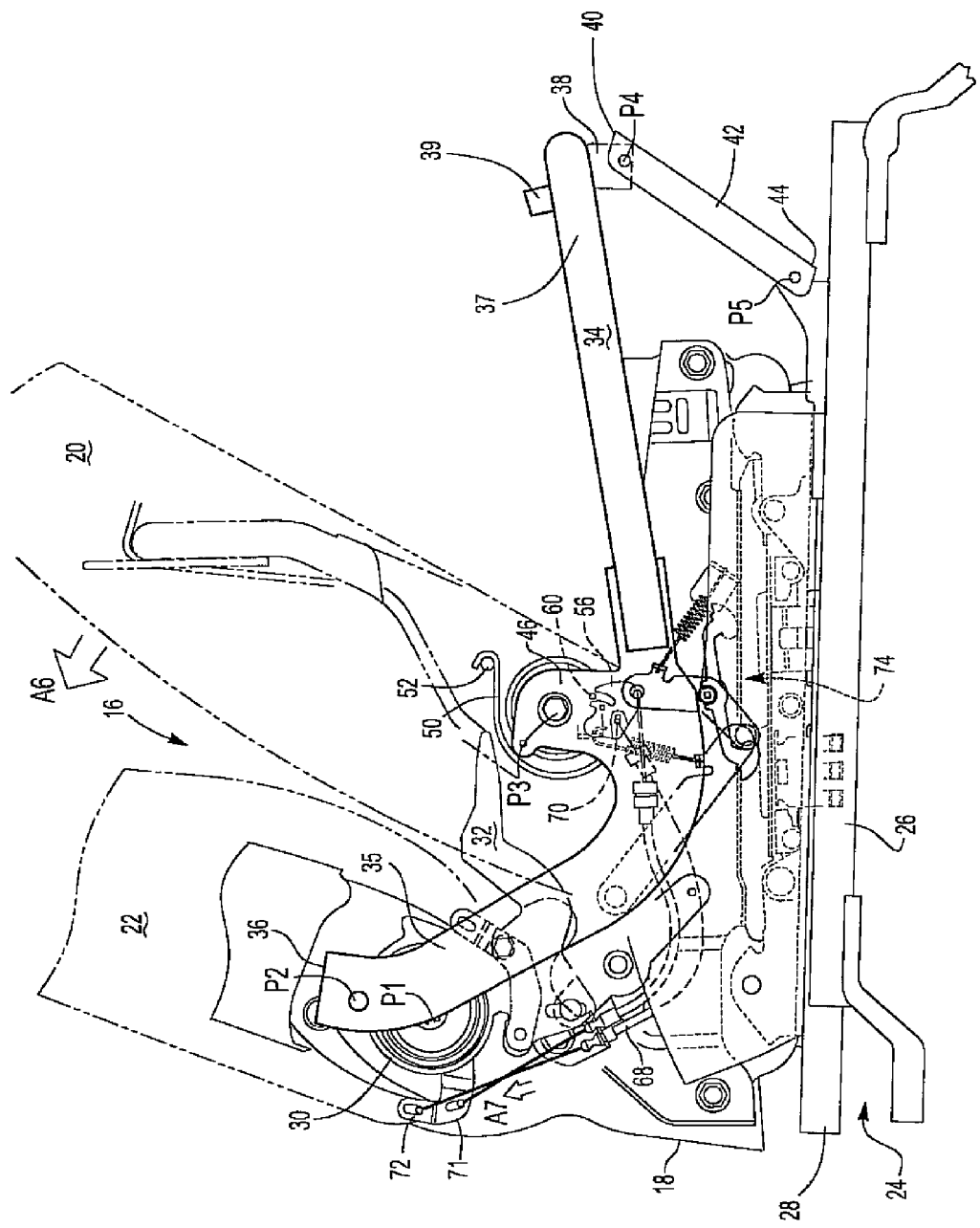
FIG. 4A is a partial side elevational view of the seat assembly showing the seat cushion in the stowed position, the seat back in the stowed position and the sub frame in the stowed position.

As seen in FIGS. 3A and 3B, movement of the latch 56 in the direction of A4 (i.e. from the engaged position to the disengaged position), disengages the retention member 60 from the elongated slot 58, thereby unlocking the seat cushion 20 from the seated position. Upon movement of the latch 56 from the engaged position to the disengaged position, the seat cushion biasing mechanism 50, no longer restrained by the engagement of the elongated slot 58 and the retention member 60, biases the seat cushion 20 in the direction of A5 towards the stowed position, as seen in FIG. 4A. As the sub frame 34 is pivotally mounted to the seat back 22 and pivotally attached to the base frame 18 through the link member 42, the movement of the seat back 22 drives the sub frame 34 slightly forward and downward into the stowed position as seen in FIG. 3A, as the link member 42 pivots about the at the second end 44.

As such, the seat assembly 16 provides a passenger with the ability to move the seat assembly from a seated position, with the seat cushion 20 and the seat back 22 both in the seated position, to the stowed position, with the seat cushion 20 and the seat back 22 both in the stowed position, through the actuation of only the lever 32.

Referring now to FIGS. 4A and 4B, to return the seat assembly 16 to the seated position an occupant first pushes the seat back 22 in the direction of A6 with enough force to overcome the force of the seat back biasing mechanism 30 until the seat back latch locks the seat back 22 in the seated position. In response to the movement of the seat back 22, the sub frame 34 moves from the stowed position to the seated position. As the seat back 22 and the sub frame 34 are returned to the seated position, the rotating bracket 71 rotates with the seat back 22 and the cable 68 slackens due to the movement of the seat back end 72 in the direction of A7. Consequently, the latch biasing mechanism 64 is no longer restrained by the force exerted on the latch 56 by the latch end 70 of the cable 68 and, as such, biases the latch 56 towards the engaged position in the direction of A8.

As seen in FIGS. 5A and 5B, the seat back 22 is locked in the seated position and the latch 56 is in the engaged position. To return the seat cushion 20 to the seated position, a passenger must push the seat cushion 20 in the direction of A9 with enough force to overcome the biasing force of seat cushion biasing mechanism 50 until the seat cushion 20 is locked in the seated position. During the movement of the seat cushion 20 from the stowed position to the seated position, the latch 56, specifically the elongated slot 58, will engage the retention member 60, as seen in FIGS. 5C and 5D, at an intermediate position. At this point the latch 56 will prevent the passenger from moving the seat cushion 20 towards the stowed position, however, movement of the seat cushion 20 towards the seated position is unimpeded.

Referring to FIGS. 2B, 3B, 4B, 5B, 5C, and 5D, the engagement of the retention member 60 and the latch 56 upon movement of the seat assembly 16 between the seated position to the stowed position will now be discussed. FIG. 2B depicts the latch 56 in the engaged position and location of the retention member 60 when the seat cushion 20 is in the seated position. The seat cushion 20 is locked in the seated position when the retention member 56 is fully inserted into elongated slot 58. The retention member 60 is cinched into the elongated slot 58, due to its arcuate shape, such that movement of the retention member 60, and consequently the seat cushion 20, towards the stowed position is prevented.

In FIG. 3B latch 56 is depicted in the disengaged position due to the movement of the seat back 22 from the seated position to the stowed position. Upon movement of the latch 56 towards the disengaged position, the retention member 60 is no longer cinched by the elongated slot 58 and the seat cushion biasing mechanism 50 will bias the seat cushion 20 towards the stowed position.

FIG. 4B shows seat cushion 20 in the stowed position and the seat back 22 in the stowed position. Upon movement of the seat back 22 to the seated position, the latch 56 will return to the engaged position, as seen in 5B, and the retention member 60 will contact the guide edge 62 of the seat cushion. The movement of the seat cushion 20 from the stowed position towards the seated position, causes the retention member 60 to travel along the guide edge 62 towards the elongated slot 58 as the latch 56 is moved towards the disengaged position due to the force exerted by the retention member 60 on the guide edge 62 which exceeds the biasing force of the latch biasing mechanism 64. Referring to FIG. 5C, as the retention member 60 passes the connection point 76 between the guide edge 62 and the elongated slot 58, the cam edge of the elongated slot 58 will cinch the retention member 60 thereby automatically locking the seat cushion 20, as shown in FIG. 5D.

The point at which the retention member 60 crosses the connection point 76 from the guide edge 62 to the elongated slot 58, the seat cushion 20 is at an intermediate position between the stowed position and seated position. Movement of the seat cushion 20 from the intermediate position towards the stowed position is prevented due to the cinching effect the cam angle of the elongated slot 58 has on the retention member 60. However, movement of the seat cushion 20 from the intermediate position towards the seated position is unimpeded as the retention member 60 travels farther into the elongated slot 58 and the latch 56 will move towards the engaged position until the seat cushion 20 is locked in the seated position.

The seat assembly 16 is capable of moving from a seated position as seen in FIG. 2A to a folded position as seen in FIG. 6A. The folded position increases the amount of available cargo space as the seat back 22 is rotated to overlay the seat cushion 20, and the sub frame 34 in response to the movement of the seat back 22 is driven forwardly and downwardly to decrease the height of the seat cushion 20 allowing the seat back 22 to move closer to the floor 14.

With reference to FIGS. 2A and 6A, the movement of the seat assembly 16 from the seated position to the folded position will now be discussed. As seen in FIG. 2A, the seat assembly 16 is in the seated position with the seat back 22 locked in the generally vertical seated position, the seat cushion 20 locked in the generally horizontal seated position, the sub frame 34 in the raised seated position, and the latch 56 in the engaged position. Upon actuation of the lever 32 into the second position, the seat back latch is fully released and the seat back 22 is unlocked from the seated position. The seat back biasing mechanism 30 biases the seat back 22 towards the folded position in the direction of A1 as movement of the seat back 22 beyond the stowed position is no longer restricted due to the full release of the seat back latch. As the rotating bracket 71 is released from rotating with the seat back 22, the cable 68 does not pull the latch 56 out of the engaged position allowing the seat cushion 20 to remain locked by the locking mechanism 54 in the generally horizontal position with respect to the sub frame 34.

The movement of the seat back 22 from the seated position to the folded position drives the sub frame 34 to rotate forwardly and downwardly into the folded position as seen in FIG. 6. As the seat cushion 20 is locked in position and rotated with the sub frame 34 closer to the floor 14, the seat back 22 is allowed to rotate to a generally horizontal position overlaying the seat cushion 20, thereby increasing the overall cargo space as the seat back 22 is positioned closer to the floor 14. In order to move the seat assembly 16 from the folded position to the seated position, an occupant grasps the seat back 22 and rotates in the direction of arrow A10 which will drive the sub frame 34 and the locked seat cushion 20 from the folded position back to the seated position which will reengage the seat back 22 with the seat back latch and the rotating bracket 71, as seen in FIG. 3.

It is appreciated, of course, that the movement of the sub frame 34 and the link member 42 is optionally controlled by a second lever which prohibits movement of the sub frame 34 and the link member 42 beyond the stowed position, as seen in FIGS. 3 and 4. Further, the movement of the seat back 22 between the seated position and the stowed position is optionally controlled by the first lever 32, and the movement of the seat back 22 between the seated position and the folded position is controlled by the second lever. In this manner, actuation of the first lever 32 allows an occupant to selectively position the seat back 22 from the seated position to the stowed position, which in turn drives the seat cushion 20 from the seated position to the stowed position, and the actuation of the second lever disengages the rotating bracket 71 from rotating with the seat back 22 thereby allowing an occupant to selectively position the seat assembly 16 in the seated and folded positions. In the alternative, the second lever, or optionally a third lever, allows an occupant to move the seat back 22 from the stowed position directly to the folded position.

The invention has been described in an illustrative manner. It is, therefore, to be understood that the terminology used is intended to be in the nature of words of description rather than of limitation. Many modifications and variations of the invention are possible in light of the above teachings. Thus within the scope of the appended claims the invention may be practiced other than as specifically described.

It is claimed:

1. A seat assembly for supporting an occupant in a passenger compartment of a vehicle having a floor, said seat assembly comprising:
   a base frame operatively attached to the floor of the vehicle;
   a seat back pivotally coupled to said base frame about a first pivot axis for movement between a seated position, a stowed position, and a folded position;
   a sub frame having a proximate end and a distal end, said proximate end pivotally coupled to said seat back about a second pivot axis for movement between a seated position and a folded position;
   a seat cushion pivotally coupled to said sub frame about a third pivot axis for movement between a generally horizontal seated position and a generally vertical stowed position, said third pivot axis positioned between said distal end of said sub frame and said proximate end of said sub frame; and
   a link member having a first end and a second end, said first end pivotally coupled to said base frame, and said second end pivotally coupled to said distal end of said sub frame;
   wherein movement of said seat back between said seated position and said folded position drives said sub frame between said seated position to said folded position.

2. The seat assembly of claim 1, wherein said second pivot axis is parallel to and spaced apart from said first pivot axis.

3. The seat assembly of claim 1, wherein movement of said seat back from said seated position to said stowed position automatically moves said seat cushion from said seated position to said stowed position.

4. The seat assembly of claim 3, wherein said seat back overlays said seat cushion when is said folded position, and wherein movement of said seat back from said folded position to said seated position automatically moves said sub frame from said folded position to said seated position.

5. The seat assembly of claim 3, further comprising a locking mechanism mounted between said proximate end and said distal end of said sub frame, said locking mechanism operable to lock said seat cushion in said seated position, and to release said seat cushion from said seated position upon movement of said seat back from said seated position to said stowed position.

6. The seat assembly of claim 5, wherein said seat cushion includes an outwardly extending retention member which engages said locking mechanism to lock said seat cushion in said seated position and to prevent the movement of said seat cushion from an intermediate position towards said stowed position, said intermediate position being between said seated position and said stowed position.

7. The seat assembly of claim 6 wherein said locking mechanism includes a latch pivotally mounted to said sub frame for movement between an engaged position and a disengaged position, said latch having an elongated slot dimensioned to receive said retention member to prevent movement of said seat cushion from said intermediate position towards said stowed position, and to lock said seat cushion in said seated position when said latch is in said engaged position and said seat cushion is in said seated position.

8. The seat assembly of claim 7, wherein said latch has an exterior guide edge and wherein said retention member contacts said guide edge when said latch is in said engaged position and said seat cushion is in said stowed position.

9. The seat assembly of claim 8, wherein upon movement of said seat cushion from said stowed position towards said seated position, said retention member travels along said guide edge towards said elongated slot while pushing said latch from said engaged position towards said disengaged position until said retention member engages said elongated slot when said seat cushion is in said intermediate position.

10. The seat assembly of claim 9, wherein upon the engagement of said retention member with said elongated slot, movement of said seat cushion from said intermediate position towards said seated position pushes said retention member farther into said elongated slot and wherein said latch moves towards said engaged position until said seat cushion is in said seated position and said latch is in said engaged position thereby locking said seat cushion in said seated position.

11. The seat assembly of claim 9, further comprising a connector having a first end attached to said latch and a second end opposite said first end attached to said seat back such that movement of said seat back from said seated position to said stowed position moves said latch from said engaged position to said disengaged position.

12. The seat assembly of claim 11, wherein when said seat cushion is locked in said seated position, movement of said seatback from said seated position to said stowed position moves said latch from said engaged position to said disengaged position wherein said retention member disengages from said elongated slot to unlock said seat cushion from said seated position.

13. The seat assembly of claim 12, further comprising a seat cushion biasing mechanism attached to said seat cushion to bias said seat cushion towards said stowed position such that upon disengagement of said retention member from said elongated slot said seat cushion is automatically moved to the stowed position due to the biasing force of said seat cushion biasing member.

14. The seat assembly of claim 13, further comprising a latch biasing mechanism attached to said latch to bias said latch towards said engaged position such that upon movement of said seat back to said stowed position said connector overcomes the biasing force of said latch biasing member to move said latch from said engaged position to said disengaged position and wherein upon movement of said seat back from said stowed position to said seated position said latch is moved from the disengaged position to said engaged position due to the biasing force of said latch biasing member.

15. A seat assembly for supporting an occupant in a passenger compartment of a vehicle having a floor, said seat assembly comprising:
   a base frame operatively attached to the floor of the vehicle;
   a seat back pivotally coupled to said base frame about a first pivot axis for movement between a seated position, a stowed position, and a folded position;

a sub frame having a proximate end and a distal end, said proximate end pivotally coupled to said seat back about a second pivot axis for movement between a seated position and a folded position;

a seat cushion pivotally coupled to said sub frame about a third pivot axis for movement between a seated position and a stowed position, said seat cushion includes an outwardly extending retention member;

a link member having a first end and a second end, said first end pivotally coupled to said base frame, and said second end pivotally coupled to said distal end of said sub frame; and a locking mechanism mounted between said proximate end and said distal end of said sub-frame, said locking mechanism includes a latch pivotally mounted to said sub frame for movement between an engaged position and a disengaged position, said latch having an elongated slot dimensioned to receive said retention member to prevent movement of said seat cushion from an intermediate position towards said stowed position, and to lock said seat cushion in said seated position when said latch is in said engaged position and said seat cushion is in said seated position, said latch having an exterior guide edge and said retention member contacts said guide edge when said latch is in said engaged position and said seat cushion is in said stowed position, said locking mechanism automatically releases said seat cushion from said seated position and said seat cushion moves from said seated position to said stowed position upon movement of said seat back from said seated position to said stowed position;

wherein upon movement of said seat cushion from said stowed position towards said seated position, said retention member travels along said guide edge towards said elongated slot while pushing said latch from said engaged position towards said disengaged position until said retention member engages said elongated slot when said seat cushion is in said intermediate position;

wherein movement of said seat back between said seated position and said folded position drives said sub frame between said seated position to said folded position.

16. The seat assembly of claim 15, wherein upon the engagement of said retention member with said elongated slot, movement of said seat cushion from said intermediate position towards said seated position pushes said retention member farther into said elongated slot and wherein said latch moves towards said engaged position until said seat cushion is in said seated position and said latch is in said engaged position thereby locking said seat cushion in said seated position.

17. The seat assembly of claim 16, further comprising a connector having a first end attached to said latch and a second end opposite said first end attached to said seat back such that movement of said seat back from said seated position to said stowed position moves said latch from said engaged position to said disengaged position.

18. The seat assembly of claim 17, wherein when said seat cushion is locked in said seated position, movement of said seatback from said seated position to said stowed position moves said latch from said engaged position to said disengaged position wherein said retention member disengages from said elongated slot to unlock said seat cushion from said seated position.

19. The seat assembly of claim 18, further comprising a seat cushion biasing mechanism attached to said seat cushion to bias said seat cushion towards said stowed position such that upon disengagement of said retention member from said elongated slot said seat cushion is automatically moved to the stowed position due to the biasing force of said seat cushion biasing member.

20. The seat assembly of claim 19, further comprising a latch biasing mechanism attached to said latch to bias said latch towards said engaged position such that upon movement of said seat back to said stowed position said connector overcomes the biasing force of said latch biasing member to move said latch from said engaged position to said disengaged position and wherein upon movement of said seat back from said stowed position to said seated position said latch is moved from the disengaged position to said engaged position due to the biasing force of said latch biasing member.

* * * * *